United States Patent
Grossman et al.

(10) Patent No.: US 12,069,072 B2
(45) Date of Patent: Aug. 20, 2024

(54) SYSTEMS AND METHODS FOR DETECTING MALICIOUS NETWORK TRAFFIC USING MULTI-DOMAIN MACHINE LEARNING

(71) Applicant: IronNet Cybersecurity, Inc., McLean, VA (US)

(72) Inventors: Robert L. Grossman, River Forest, IL (US); James E. Heath, Sugarloaf Key, FL (US)

(73) Assignee: IronNet Cybersecurity, Inc., McLean, VA (US)

( * ) Notice: Subject to any disclaimer, the term of this patent is extended or adjusted under 35 U.S.C. 154(b) by 691 days.

(21) Appl. No.: 17/136,582

(22) Filed: Dec. 29, 2020

(65) Prior Publication Data

US 2022/0210171 A1    Jun. 30, 2022

(51) Int. Cl.
*H04L 9/40* (2022.01)
*G06N 20/00* (2019.01)

(52) U.S. Cl.
CPC ......... *H04L 63/1425* (2013.01); *G06N 20/00* (2019.01); *H04L 63/10* (2013.01)

(58) Field of Classification Search
CPC ............. H04L 63/1425; H04L 63/1433; H04L 47/2433; H04L 61/4511; H04L 67/61; H04L 41/0894; H04L 41/5022; H04L 47/2483; H04L 47/805; H04L 41/5093; H04L 41/0853
See application file for complete search history.

(56) References Cited

U.S. PATENT DOCUMENTS

| | | | |
|---|---|---|---|
| 2007/0087756 A1* | 4/2007 | Hoffberg | G06Q 10/06375 455/450 |
| 2011/0039237 A1 | 2/2011 | Skare | |
| 2014/0025211 A1 | 1/2014 | Cheim | |
| 2016/0357962 A1 | 12/2016 | Tyagi | |
| 2018/0048530 A1 | 2/2018 | Nikitaki | |
| 2018/0320658 A1 | 11/2018 | Herzog | |

(Continued)

FOREIGN PATENT DOCUMENTS

| | | |
|---|---|---|
| AU | 2011221399 | 9/2011 |
| CN | 103986238 | 8/2014 |
| WO | 2021118461 | 6/2021 |

OTHER PUBLICATIONS

Dunteman; "Principal Components Analysis"; Sage Publications, Inc.; 1989; 96 pages.

(Continued)

*Primary Examiner* — Hitesh Patel
(74) *Attorney, Agent, or Firm* — Fitch, Even, Tabin & Flannery, LLP

(57) ABSTRACT

System and methods for cross-domain training and updating of models to perform classification and scoring of network data/traffic are described. Information used to build deep machine learning models about traffic in one domain is used to improve the modeling in another domain. By using cross-domain learning, labeled data from another domain can be used to improve the detection rate and false positive rate of an analytic model in another domain. Because of the construction of the models, and because the models, and not the data are transferred, there is no disclosure of personally identifiable or otherwise restricted information.

19 Claims, 8 Drawing Sheets

(56) References Cited

U.S. PATENT DOCUMENTS

| | | | |
|---|---|---|---|
| 2019/0364060 A1 | 11/2019 | Muddu | |
| 2020/0076841 A1* | 3/2020 | Hajimirsadeghi | H04L 63/1408 |
| 2020/0274894 A1* | 8/2020 | Argoeti | H04L 63/1433 |
| 2020/0322367 A1 | 10/2020 | Salvat Lozano | |
| 2021/0203157 A1 | 7/2021 | Visweswariah | |

OTHER PUBLICATIONS

Grossman; U.S. Appl. No. 17/531,696, filed Nov. 19, 2021.

Media Research Council; "Invalid Traffic Detection and Filtration Standards Addendum"; Jun. 2020; 55 pages.

Mikolov et al.; "Distributed Representations of Words and Phrases and their Compositionality"; Advances in Neural Processing Systems; Oct. 16, 2013; pp. 3111-3119.

Mikolov et al.; "Efficient Estimation of Word Representations in Vector Space"; Sep. 7, 2013; arXiv:1301.3781v3; 12 pages.

National Grid ESO; Appendices to the Technical Report on the events of Aug. 9, 2019; https://www.nationalgrideso.com; Document 152351; Sep. 6, 2019; 95 pages.

Ngiam et al.; "Multimodal Deep Learning"; Proceedings of the 28th International Conference on Machine Learning; 2011; 8 pages.

United Kingdom National Grid Electricity System Operator (ESO); "Technical Report on the events of Aug. 9, 2019"; Sep. 6, 2019; 37 pages.

US Cybersecurity and Infrastructure Security Agency (CISA), D. of H.S., "3ve-Major Online Ad Fraud Operation"; Nov. 27, 2018; 4 pages; https://us-cert.cisa.gov/ncas/alerts/TA18-331A; downloaded Dec. 18, 21.

Vincent, et al.; "Stacked Denoising Autoencoders: Learning Useful Representations in a Deep Network with a Local Denoising Criterion"; Journal of Machine Learning Research; vol. 11, No. 12, Dec. 2010; 38 pages.

Wikipedia; "SCADA"; https://en.wikipedia.org/wiki/SCADA; downloaded Aug. 10, 2021; Jun. 19, 2021; 13 pages.

PCT; International Search Report and Written Opinion for PCT/US22/049636 mailed from the International Searching Authority on Feb. 10, 2023.

Peisert et al; "Supporting Cyber Security of Power Distribution Systems by Detecting Differences Between Real-time Micro-Synchrophasor Measurements and Cyber-Reported SCADA—Final Report"; Permalink: https://escholarship.org/uc/item/4fr3h63c; Oct. 15, 2018; 36 pgs.

PCT; International Search Report and Written Opinion for PCT/US21/64736 mailed from the International Searching Authority on Mar. 17, 2022.

* cited by examiner

SYSTEMS AND METHODS FOR DETECTING MALICIOUS NETWORK TRAFFIC USING MULTI-DOMAIN MACHINE LEARNING

FIELD OF TECHNOLOGY

The embodiments relate to detecting and preventing malicious activity using machine learning. More particularly, the systems and methods relate to detecting and categorizing invalid and malicious network traffic by using machine learning to train models, including behavioral models, across multiple domains.

BACKGROUND

Remote cyber intrusions, fraud, unauthorized tracking, and other malicious behaviors over the internet, wireless networks, cellular and mobile networks, streaming media services, connected televisions, and other over-the-top (OTT) media services is both growing and becoming more connected. The amount of malicious, prohibited, and fraudulent behavior over an increasing number of networks and services is growing. This behavior is becoming more connected as the same actors are likely to engage in similar behavior over more than one network and/or domain.

Malicious behaviors and activity may include data from more than one application domain. The various domains may include invalid traffic in web advertising traffic, invalid traffic in streaming video advertising traffic, and malicious activity in cybersecurity, etc. Malicious activity in one or more domains has the potential to affect innocent parties in a different domain. For example, a first malicious cyber actor may infect and compromise personal computers by creating a botnet. A second bad actor may set up a network of counterfeit websites that may be rented out to a third fraudulent actor who may use the botnet created by the first malicious cyber actor. The botnet may be used to display ads from the counterfeit websites, set up by the second bad actor, to create invalid advertising traffic that an innocent advertiser pays for. In another example, a malicious cyber actor can set up a botnet that can be used for malicious cyber activities, such as network surveillance, network exploitation, and malware installation. The malware may then be used to create invalid advertising traffic, such as the advertising described above.

DETAILED DESCRIPTION

Figure 1:
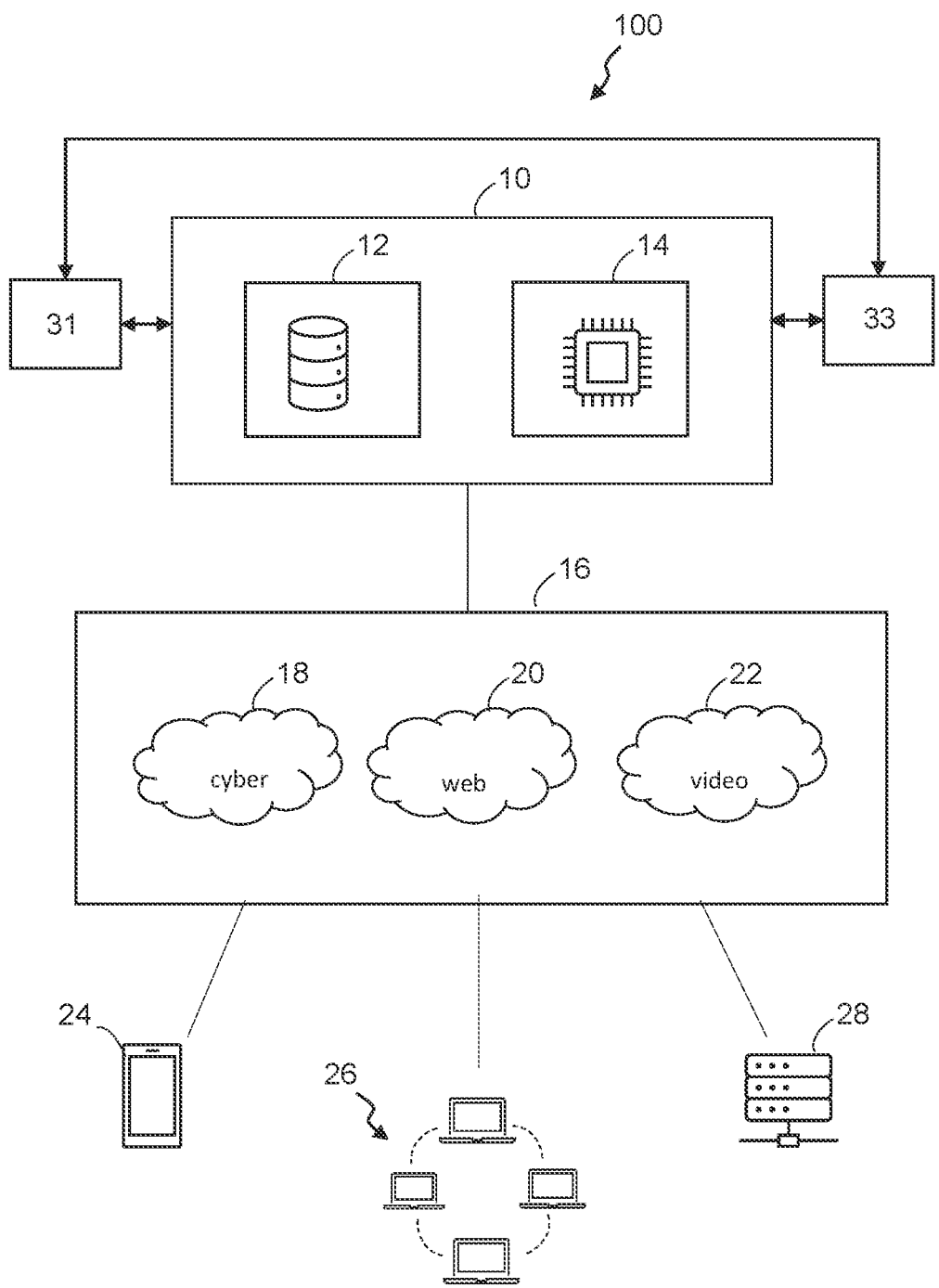
FIG. 1 is an illustration of an exemplary computer-based system having a computing module, a machine learning module, and a cross-domain training module. The exemplary system may be connected to a multi-domain network that facilitates communication between a plurality of devices, according to some embodiments.

Generally speaking, pursuant to various embodiments, systems, devices, and methods are provided herein useful in providing multi-domain machine learning and cross-domain training of models (e.g., behavioral models) in order to detect and reduce invalid or malicious network traffic or activity that occurs on a plurality of devices over a plurality of domains over a plurality of networks. The devices on the network may include, for example, websites, computing devices, mobile devices, servers etc., and/or any combination thereof. These devices may belong to a customer. The embodiments herein provide solutions to users or customers or users of the devices who seek to classify network traffic and prevent malicious network traffic from infecting their individual devices or group of networked devices, without disclosing personal, confidential or otherwise restricted information.

The embodiments herein transfer and reuse knowledge gained in one domain to directly improve analytic models in another domain, without exposing confidential data (e.g., personally identifying information) or other sensitive information, which should be kept private for regulatory, public policy, or other reasons. More specifically, the embodiments herein leverage information used to build models about network traffic in one domain to improve the modeling of traffic in another domain. For example, a model built to identify potentially malicious traffic in the cyber domain can be used to improve a model built to identify invalid traffic in the advertising domain and vice versa.

Because the labeled data from one domain is not sufficient to build an analytic model with the desired detection rate and false positive rate, the embodiments herein use cross domain learning such that labeled data from another domain can be used to improve the detection rate and false positive rate of an analytic model in another domain. More specifically, in some embodiments, the domains of cyber, computational advertising, influencers, and online commerce are used with cross-domain learning using the system disclosed to improve the performance of models in one domain using models from another domain. Further, according to some embodiments, models are built that do not disclose personally identifiable or other restricted information. Because the models, and not the data, are transferred, there is no disclosure of personally identifiable or other restricted information. This provides additional privacy and data security advantages, in accordance with the embodiments described herein.

In some embodiments, the following terminology may be used to describe the elements, characteristics, and advantages of the embodiments. For reference, a few key terms may be defined, but are not limited to, the definitions as follows.

Machine learning may refer to using computer-based artificial intelligence (AI) systems and methods to build models based on sample data, known as "training data", in order to make predictions or decisions without being explicitly programmed to do so. One type of machine learning is deep learning in the broader family of machine learning and is an artificial intelligence (AI) function that is motivated by the workings of the human brain in processing data and creating patterns for use in the decision making.

Domains may be referred to as cyber traffic, web interfaces traffic, computational advertising, web advertising traffic, and video advertising traffic; mobile web interactions and transactions, influencers, online commerce etc.

Embeddings may be defined as a component in machine learning and may refer to the translation or mapping of a high-dimensional vector into a low-dimensional space, for example, the mapping of a network traffic event as described herein.

Invalid traffic (IVT) may include traffic or associated network or media activity that does not meet certain quality or completeness criteria, or otherwise does not represent legitimate traffic that should be included in measurement counts.

A layer may be used to refer to a specific layer in a deep learning model consisting of multiple connected layers or to a machine learning model in a hierarchical machine learning model that comprises several interconnected machine learning models.

Malicious traffic may include any traffic from bad actors, agents, bots, or other sources in cyberspace that are engaged in, or attempting to engage in, network surveillance, network exploitation, command and control activities, insertion of malware, including ransomware, network attacks, and related activities that pose a threat to a network and the devices within the network.

Multi-domain machine learning herein may include using models to detect actions by bad actors in cyberspace, models to detect invalid traffic on websites, and invalid traffic in streaming video share some common characteristics, such having a source or device internet protocol (IP) and a source or device user-agent, but also other characteristics that are unique to each domain, such as the use of large numbers of internet domains using domain generation algorithms that occur in certain types of malware or the use of specialized tags that occur in certain types of advertising. In general, although there may be large amounts of data generated in these applications, the amount of data that is labeled with valid/invalid traffic, normal/bad behavior, fraud/no fraud, etc. is often quite limited. In the systems and methods herein, labeled data from one domain may be used to help build models in another domain.

Network traffic, which is sometimes called more simply traffic, may include network traffic related to the internet, including web interfaces interactions and transactions, mobile networks, the internet of things (IoT), and operational technology (OT) generally, as well as more specialized network traffic, such as network traffic related to cybersecurity, criminal behavior, advertising, fraud, and related areas.

Turning to FIG. 1, a computer-based system 100 for identifying malicious traffic on a network overview according to some embodiments is illustrated. The computer-based system 100 includes a computing module 10 having a processor 14 and a memory 12 for storing instructions. The computing module 10 is coupled to a network 16 have a plurality of domains 18, 20 and 22 in which network traffic is created and communicated. In an embodiment, three such domains are cyber, web and video. Network traffic is generated by devices connected to the network and may include, for example, devices such as mobile devices 24 (e.g., phone, tablets, laptops); networked devices 26 (e.g., a plurality of computing devices); and servers 28 (e.g., cloud-based servers). The computer-based system 100 also includes a machine learning module 31 communicatively coupled to the computing module 10. The machine learning module 31 is configured to build a plurality of deep learning models. The system 100 also includes a cross-domain training module 33 communicatively coupled to the machine learning module 31 and/or the computing module 10. The cross-domain training module 33 is configured to update one or more deep learning models thereby creating a cross-domain trained model. The operation and functioning of embodiments of modules 31 and 33 will be described in further detail throughout the specification.

Figure 2:
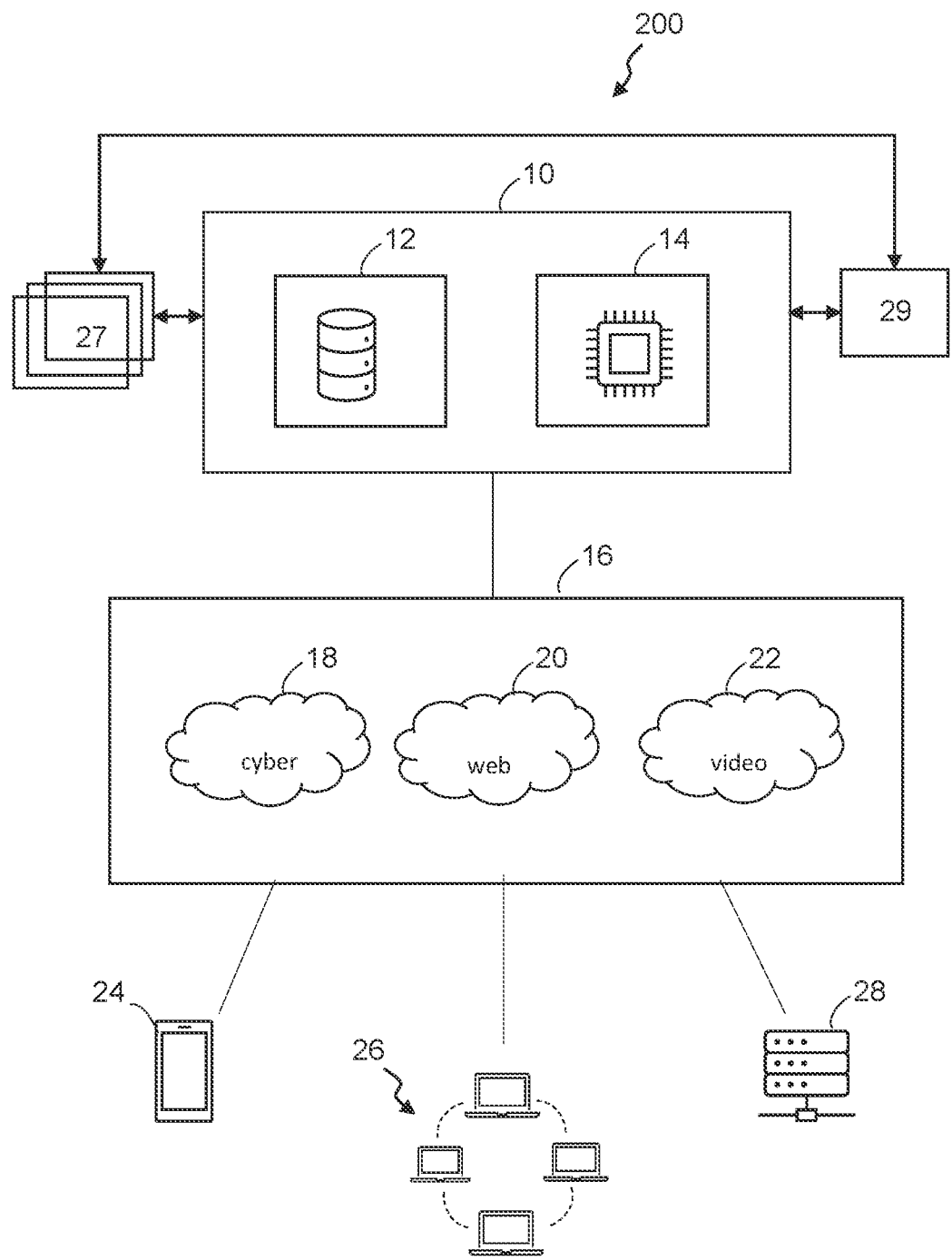
FIG. 2 is an illustration of another exemplary computer-based system having a computing module, a plurality of embedding modules, and a multi-domain embedding module, according to some embodiments.

FIG. 2 is another embodiment of a computer-based system 200 for identifying malicious or invalid network traffic in a multi-domain network. The system 200 is connected to a multi-domain network 16 that facilitates communication between a plurality of devices 24, 26, 28, as similarly provided in FIG. 1. In addition to a computing module 10 having a processor 12 and a memory 14, the system 200 also includes a plurality of embedding modules 27 adapted and configured to process traffic from a first domain and second domain within the network 16. The system 200 further includes a multi-domain embedding module 29, communicatively coupled to the plurality of embedding modules 27, for storing embeddings from at least the first 18 and second domain 20, the first 18 and second 20 domains being different from each other. The processor 14 of the computing module 10 may be configured to cause the computing module 10 to: observe traffic in the network 16; compute traffic embeddings from the first and second domain using the plurality of embedding modules 27; compute multi-domain embeddings from the first 18 and second 20 domain; train a deep learning model using the multi-domain embeddings; and compute a score of the traffic using the trained deep learning model. The computed score indicates a likelihood of identifying the traffic as being malicious or invalid. In an embodiment, the first and second domains may be one of: cybersecurity data, video data, web interface interactions, web interface transactions, web advertising, mobile site advertising, advertising in streaming, and advertising in over-the-top services. In an embodiment, the trained deep learning model is continuously evaluated for performance and automatically updated. In an embodiment, the computing module 10 is configured to create an alert based on a value of the score above a threshold, and blocks traffic within the network 16 based on the value of the score.

Network Traffic Embeddings

According to some embodiments, network traffic embeddings are used to embed events generated from network traffic and to be cross domain. These cross-domain embeddings may create several different types of signatures, including temporal signatures, domain signatures and other types of signatures, such as structural signatures, as will be described below in further detail.

In an embodiment, events are formed from network traffic, which may be represented as a sequence of vectors in a vector space. In an exemplary embodiment, it is assumed in the following example, that network traffic is observed over a period of time; that the network traffic is from, for example, a source (e.g., source IP or source port) to a destination (e.g., destination IP or destination port). All external traffic to internal systems and customer devices (e.g., devices 24, 26, and 28 in FIG. 1) within a network boundary are observed over a period of time. This boundary may be referred to as the "customer's network". It can also be assumed that statistics are collected for the traffic over a time windows of length d[1], d[2] and d[3], with d[1]<d[2] <d[3]. Note: the customer's network may be, for example, a single website, a collection of websites, a collection of computers (e.g., PCs, mobile phones, tablets, laptops) associated with users in the customer's network, servers that provide servers to the users' computers, or a more complex set of devices on a network 16. In this example, the source IP and destination IP are fixed, and for each fixed such pair, events are formed from the network traffic by defining vectors.

The vector components may be defined as follows. The first component is the source port. A second component is the destination port. A third component is the number of network packets during time window d[1]. A fourth component is the number of network packets during time window d[2]. A fifth component is the number of destination IPs that the source IP sends traffic to within the customer's network during time window d[2]. And, sixth component is the number of destination IPs that the source IP sends traffic to within the customer site during time window d[3]. In this example, only six components have been defined, however, in other embodiments, there may be additional components in an event vector.

Further, it can be understood by one of ordinary skill in the art that the aforementioned embodiment is only one example of how event features from network traffic can be computed according to the instant application. The embodiments may also include other method of counting different types network activity that may be used to create event vectors of features may also be used to define the event vectors from network traffic for the embodiments described in this disclosure. In addition, according to some embodiments herein, event features defined in this way are sparse vectors in a high dimensional vector space.

Second, following the aforementioned defining of vector components, then separately, for both each type of domain traffic collected (e.g., cyber traffic and advertising traffic), continuous dense vectors may defined in a lower dimensional vector space. This can be done in several different ways. In one embodiment, continuous dense vectors are defined by using deep neural networks, for example, by not limited to, using the skip-gram or continuous bag of words (CBOW) model described in (Mikolov et al., 2013a). In this embodiment, a stochastic gradient descent calculation can be used to estimate the parameters of the two deep learning models. In this exemplary embodiment, embeddings are constructed for cyber events to a vector space $V_1$ and for advertising events to a vector space $V_2$.

Third, the vector spaces $V_1$ and $V_2$ may be mapped to a common vector space V. This may be done in several different ways. In one embodiment, there are a limited number of pairs of events E in the two domains that are known to come from the same bad actor (e.g., each pair may come from a separate bad actor), such as when the bad actor (associated, for example, with events in $V_1$) infects one of the devices 26 with malware (an example of cyber invalid traffic or CIVT) and then uses the device 26 as bad actor (associated, for example, with events in $V_2$) for fraudulent advertising (an example of general invalid traffic (GIVT) or specialized invalid traffic (SIVT), depending upon the sophistication of the fraudulent advertising). In this embodiment, principal components may be used in both vector space $V_1$ and $V_2$ independently to map both $V_1$ and $V_2$ to a lower dimensional space $U_1$ and $U_2$, both of dimension m, with maps $A_1$ and $A_2$; and, then find rotations $R_1$ and $R_2$ to so that pairs events E that are known to come from common bad actors are aligned with minimal error in common vector space W. In this way, maps $A_1$ and $A_2$ and $R_1$ and $R_2$ are defined so that the composition $R_1 A_1$ and $R_2 A_2$ map $V_1$ and $V_2$ respectively to a common vector space V. A single rotation R may also be used that minimizes the error, and takes $U_1$ as V and uses the maps $A_1$ and R, and $A_2$ to map $V_1$ and $V_2$ respectively to V. In another embodiment, stochastic gradient descent calculations may be used to estimate a matrix W from $V_1$ to $V_2$ and use this matrix to create a common vector space V for embedding both cyber and advertising traffic into a common vector space V.

Note, although the foregoing two embodiments have been described, other approaches for embedding traffic can be used in other embodiments of the systems and methods herein. For example, "structural signatures" of rank k, may be computed, for example, by computing features in each domain as described above; computing the first k-principal components; and using these as inputs to the deep-learning to build the models to transfer between domains. In another embodiment, "temporal signatures" may be computed from the first and second difference of the timings of events that may be shared across domains.

This approach may be used to create a common embedding space for three, four or more embeddings, for example, but not limited to, cyber traffic, web interfaces traffic, web advertising traffic, and video advertising traffic. These multi-domain embeddings may then be used, as will be described below in further detail, to create (single task) machine learning models that produce scores indicating the likelihood that traffic is invalid, or to create multi-task machine learning models that produce multiple scores, such as a score for cyber traffic and a score for web traffic, indicating that the respective type of traffic is invalid. In some embodiments, higher scores may indicate that the traffic is more likely to be invalid traffic (IVT), in the case of web and video advertising (GIVT or SIVT), or malicious, in the case of cyber activity (CIVT).

One of the benefits and advantages of the instant application is the use of embeddings as described above. In utilizing the embodiments herein, embeddings may be defined in which no restricted data (e.g., personally identifying information, confidential information, private information etc.) is used to create the embeddings. This addresses one of the challenges of conventional systems in which there is insufficient labeled data to build good machine learning models. In contrast, the embodiments herein use labeled data from more than one domain, and no restricted data is provided.

Figure 3:
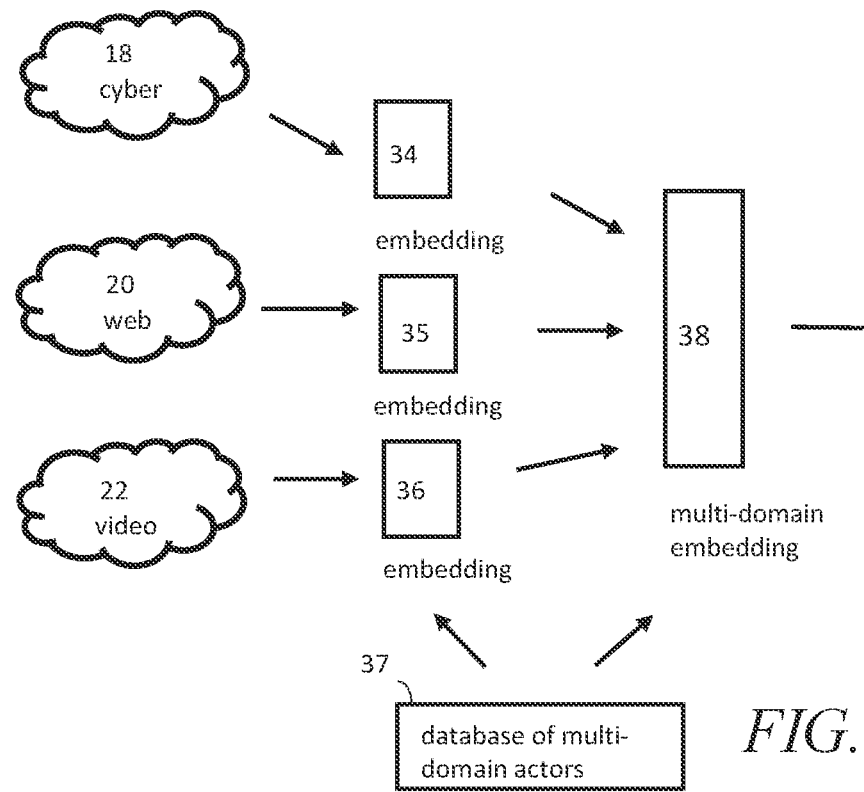
FIG. 3 is an illustration of components of an exemplary system according to some embodiments, for creating and combining embeddings for a plurality of domains to create a multi-domain embedding.

FIG. 3 is an illustration of a how embeddings for a plurality of domains (e.g., 18, 20, 22) are created and combined to create a multi-domain embedding using any of the methods described above. In this exemplary embodiment, the first embeddings 34 are computed from data from the first domain (cyber domain 18), the second embeddings 35 are computed from data from the second domain (web domain 20), and the third embeddings 36 are computed from data from the third domain (video domain 22). The first 34, second 35 and third 36 embeddings may be combined to produced multi-domain embeddings 38. In some embodiments, additional domains can be combined to produce multi-domain embeddings from a plurality of domains, (e.g., four or more) domains. For example, different types of web data could be embedded, including web advertising data, web interface interactions and transactions, interactions and transactions form the mobile web, etc. The knowledgebase or database of multi-domain actors 37 may be used as one of the mechanisms for combining single domain embeddings to compute multi-domain embeddings.

As illustrated herein using the machine learning techniques herein, the outputs of one function, transformation or model may be used as the inputs to another function, transformation, or model. As a specific example, a hierarchical model may be formed, for example, by taking the output of a classification or regression tree and using it as the input to a logistic regression function. As another specific example, a deep learning model comprises multiple linear functions and non-linear functions (activations), with the outputs of one layer being used as the inputs to the next layer. In an embodiment, one or more layers may be exported from one system and imported into another system, by using a model exchange format (e.g., Open Neural Network Exchange (ONNX) Format, Portable Format for Analytics (PFA), Predictive Model Markup Language (PMML), etc.). The exchange format may be used for expressing machine learning and deep learning models independent of the system that produces them.

In an embodiment herein, data from different customers (e.g., devices 24, 26, 28) may be used to develop the deep neural network for the multi-domain embedding 38. In addition, embedded signatures may be used for models producing scores distinguishing invalid and malicious traffic. By using the mixed embeddings with their dense representations in a lower dimension vector space, personally identifiable information (PII) from one domain may be transformed into vectors ("signatures") without identifying information and used to improve traffic scoring across domains.

Figure 4:
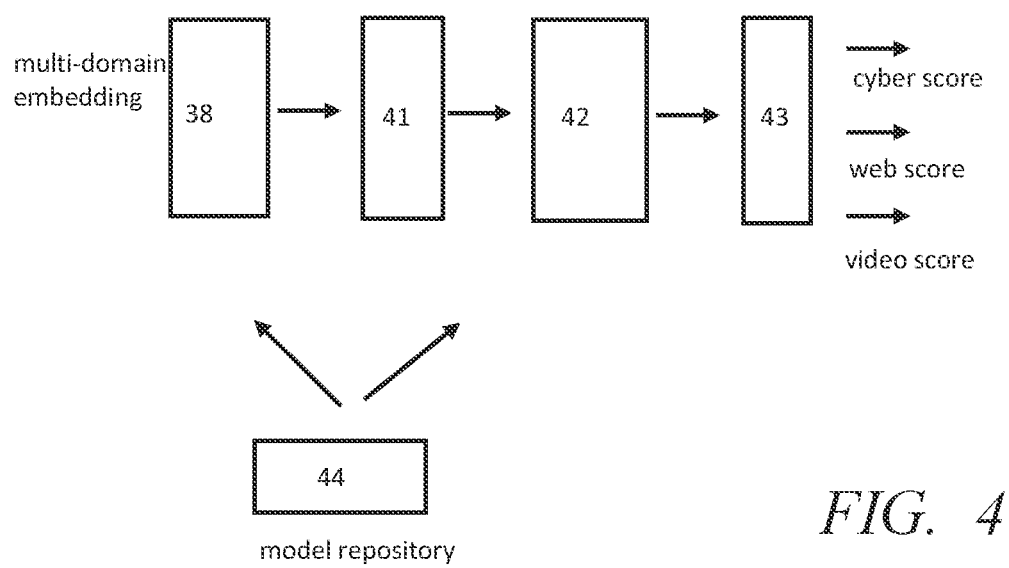
FIG. 4 is an illustration of components of an exemplary system according to some embodiments, for using multi-domain embeddings with multi-task machine learning to deploy and update machine learning models that can be simultaneously used in two or more domains (e.g., cyber, web and video) to obtain a classification, score or rating of network traffic.

FIG. 4 is an illustration of how multi-domain embeddings may be used with multi-task machine learning to deploy and update machine learning models that can be simultaneously used in two or more domains (e.g., cyber 18, web 20, video 22) to obtain a classification, score or rating of network traffic. In one embodiment, first, traffic event embeddings (34, 35, 36) are trained using data from multiple domains (18, 20, 22). These embeddings (34, 35, 36) are used as illustrated in FIG. 3 and trained with data from two or more domains to produce a multi-domain embedding (38). In a second step in FIG. 4, the multi-domain embeddings (38) are used as inputs to train layers 41, 42, 43 in a least one machine learning model using data from at least one of domains (18, 20, 22) to produce at least one score for traffic. Note, although three layers 41, 42 and 43 are shown in the FIG. 4, additional layers may be used.

As further illustrated in FIG. 4, the multi-domain embeddings 38 may be used to train a single deep learning model with layers 41, 42 and 43 to produce multiple scores across domains using multi-task learning. Layers 41, 42, 43 and the deep learning model as a whole may be stored in a model repository 44 so that the cross-domain training module 62 may be used to train deep learning models automatically and continuously update operational deep learning models as more data is received and processed from any of the domains 18, 20, 22 used for the cross-domain models 69, 61. (See FIG. 6)

Although FIGS. 3 and 4 illustrate only three domains, some embodiments herein include additional domains can be used in the same way and different combinations of three or more domains can be used for embeddings as shown in FIG. 4 and multi-task learning as shown in FIG. 4. As just one example, any of the example domains, cyber 18, web 20 (e.g., web interface interactions and transactions, web advertising), and video 22 (e.g., video advertising) can be used to defined embeddings as showing in FIG. 3 and scores based on multi-task learning as illustrated in FIG. 4.

Figure 5:
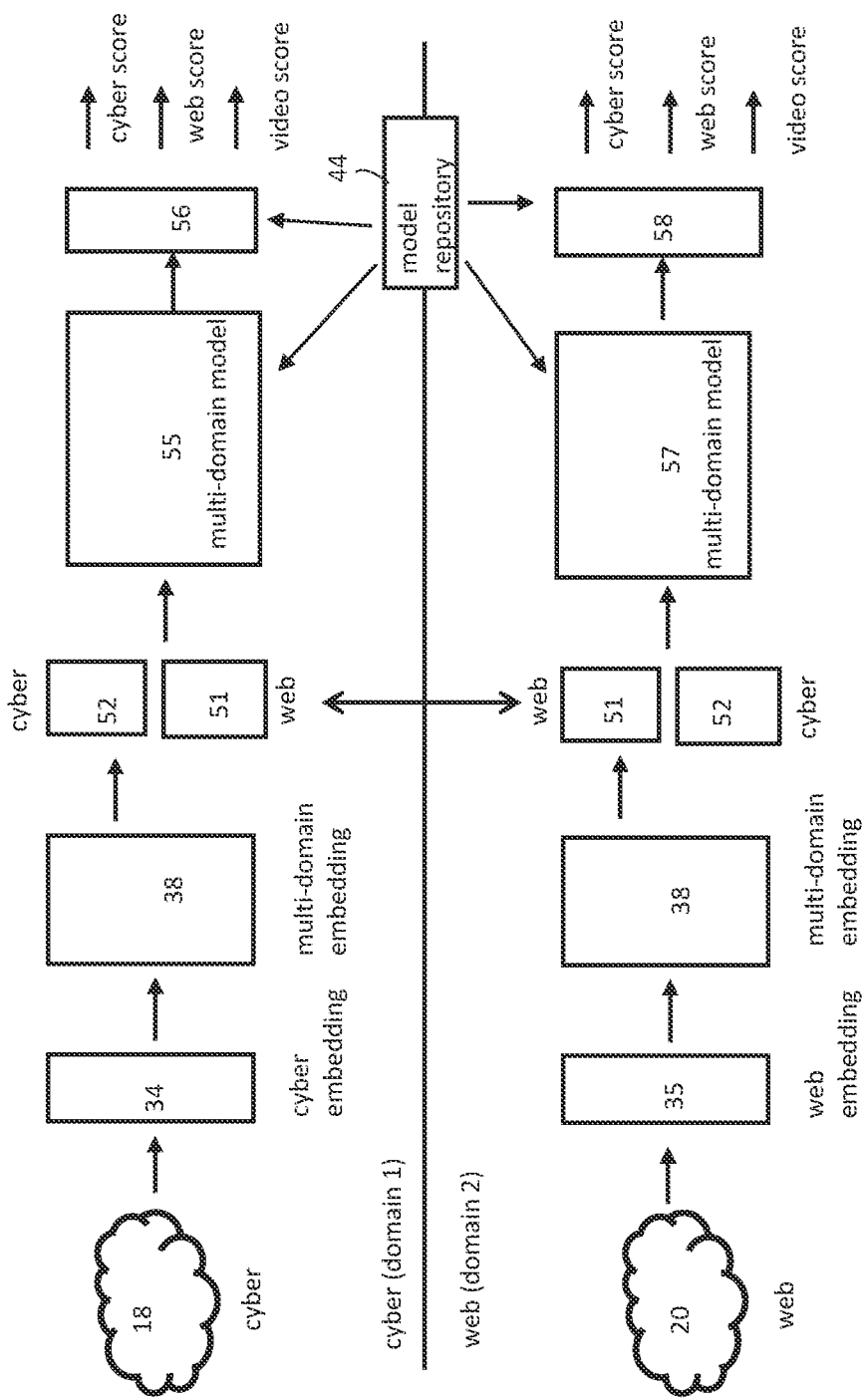
FIG. 5 is an illustration of an exemplary system for using multi-domain transfer of embeddings to build models in a first domain (e.g., cyber) to improve models in a second domain (e.g., web).

FIG. 5 illustrates how an embodiment of a system herein uses multi-domain transfer learning to build models in one domain and leverage these models to improve analytic models in another domain. More specifically, FIG. 5 illustrates an embodiment of a system for using multi-domain transfer of embeddings to build models in a first domain (e.g., cyber 18) and a second domain (e.g., web 20). In accordance with some embodiments, the models are layered as usual with deep learning, with the outputs of one layer becoming the inputs of another layer, as shown in FIG. 4. Although in FIG. 5, just a single layer of the multi-domain models 55 and 57 are shown, along with the final layer 56 and 58, in some embodiments, multi-domain models 55 and 57 consist of multiple layers. In addition, the initial layers of the network are available with this approach to move model information from one customer to another which does not disclose restricted or private data or information due to the embedding, such as, for example, shown in FIG. 3.

In an embodiment illustrated in FIG. 5, a web model 51 is trained using data from the web domain 20, which may be moved to the cyber domain 18 to enhance the multi-domain cyber model 55. Similarly, the cyber model 52 is trained using data from the cyber domain 18, which can be moved to the web domain 20 to enhance the multi-domain web model 57. Different versions of the web model 51, cyber model 52, and their layers can be stored in the model repository 44 for use with the cross-domain training module 62 described below in order to produce the best performing multi-domain trained models.

In an embodiment, deep learning models are used to classify the prevalence (low, medium, high) of bot activity for advertising in a website are built, and transfer learning and domain adaption are used to build cyber models, and vice versa. In this way, multi-domain invalid traffic scores (MDIVT) can be computed in which information from, for example, cyber malicious traffic (CIVT) is used to improve the deep learning models for sophisticated invalid traffic (SIVT), and vice versa. In this way, information about malicious traffic on endpoints in the cyber domain is used to improve the analytic models for detecting sophisticated invalid traffic on websites with advertising, and vice versa.

In some embodiments, high scores associated with SIVT behaviors can be used as part of an active cyber defense to block certain traffic on endpoints within a domain. More generally, high scores associated with certain behaviors, can be used across domains to take actions to block traffic when desired. Of course, this is usually not done for SIVT since this type of traffic is usually filtered after the fact, so as not to tip off the actors engaging in fraudulent behavior.

Although, some exemplary embodiments herein use specific domains to build cross-domain models, the embodiments of the invention are not limited to any particular domains. More specifically, the methods and system for building cross-domain models for cyber, web risk and video provided herein may also be used to build cross domain models for other combinations of domains, (e.g., domains involving criminal activity, and the cyber activities of nation state actors).

Although, one implementation of this disclosure is to build cross-domain models as seen, for example in FIG. 5, we are not limited to any particular domains. More specifically, the proposed system for building cross-domain models for cyber, web risk and video could also build cross domain models for other combinations of domains, including domains involving criminal activity, and the cyber activities of nation state actors.

Figure 6:
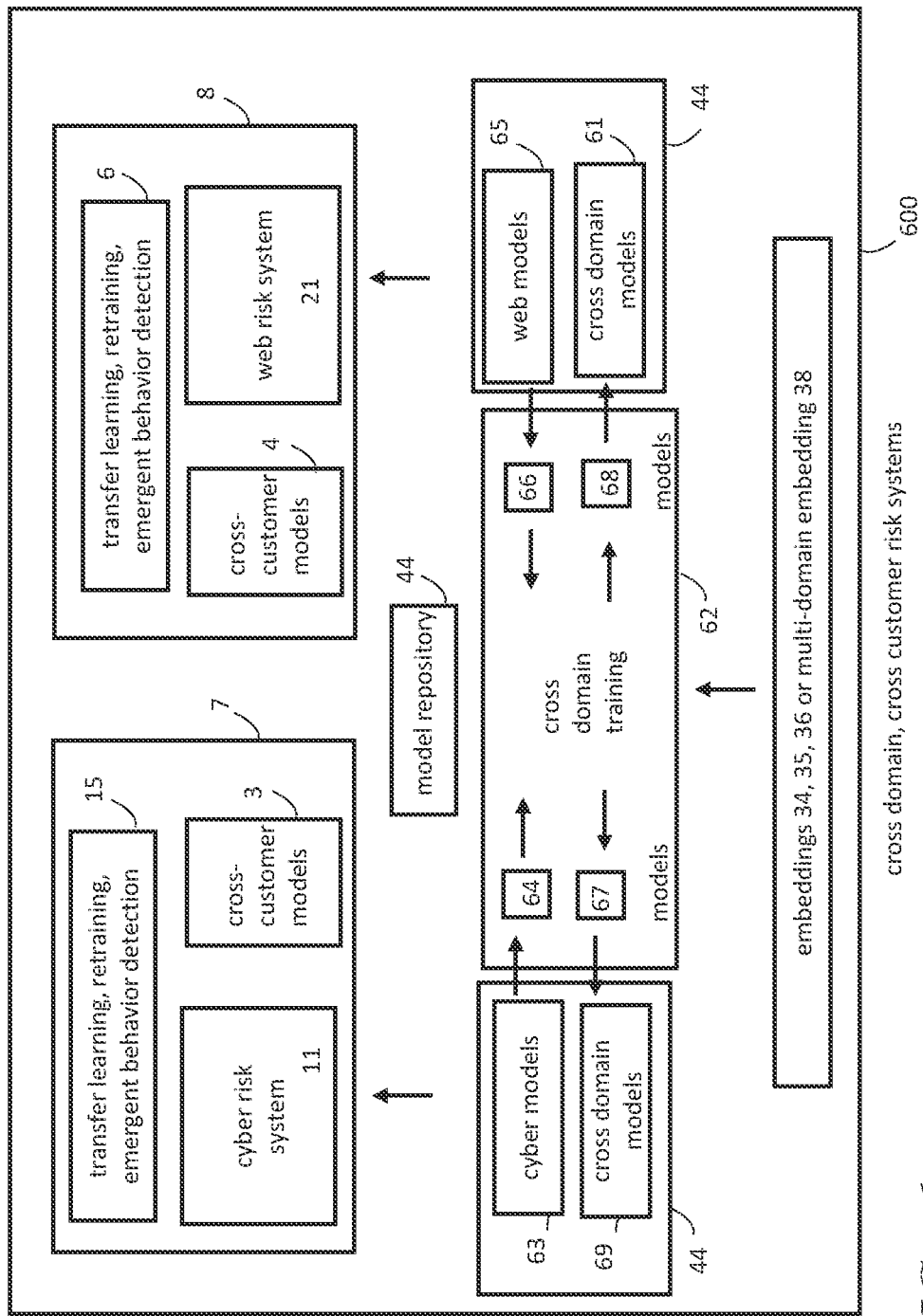
FIG. 6 is a more detailed block diagram of an exemplary embodiment of a computer-based system for identifying and/or classifying malicious or invalid traffic on a network utilizing multi-domain embeddings.

Turning to FIG. 6, an exemplary embodiment of a cross-domain cross-customer risk systems 600 that can be used to implement cross domain learning. The system 600 comprises several modules including: a cross-domain training module 62 for receiving a model (e.g., 64, 66) from one domain and using cross domain training to produce cross domain cyber and web models 69, 61; a model repository (module) 44 for managing models, including embeddings; performance modules 15 and 6 for continuously evaluating the models so that improved models can be swapped for current models when this would improve performance in the cyber risk system 11, the web risk system 21, or the cross-domain cross-customer risk system 600; and for identifying emergent behavior in cyber traffic (CIVT) or advertising (IVT) that should be examined to determine if the model needs to be tuned or additional data is needed.

In an embodiment, a first cyber model 64 for scoring malicious cyber traffic (CIVT), one of a collection of such cyber models 63, is combined with a first web model 66 for scoring invalid traffic (IVT) in advertising by the cross-domain training module 62 to produce the cross-domain model 67 that is contributed to the collection of cross-domain cyber models 69 that is used in the cyber risk system 11. As another example, a first web model 66 for scoring invalid traffic (IVT) in advertising, one of a collection of such web models 65 is combined with a first cyber model 64 for scoring malicious cyber traffic (CIVT) by the cross-domain training module 62 to produce the cross-domain model 68 that is contributed to the collection of cross-domain models 61 that is used in the web risk system 21.

Performance module 15 is responsible for continuously improving the cyber risk system 11 by testing and evaluating new cyber models 63, new cross domain models 69, and new cross-customer cyber models in module 3 to select better performing models, as well as to use these models, additional customer data, and third-party data to identify continuously new behavior with models and human analysis in order to retrain models, integrate new data, or use rules to improve the models. Similarly, module 6 is responsible for continuously improving the web risk system 21 that identifies invalid traffic IVT by testing and evaluating new web models 65, new cross domain models 61, and new cross-customer cyber models in module 4 to select better performing models, as well as to use these models, additional customer data, and third party data to identify continuously new behavior with models and human analysis in order to retrain models, integrate new data, or use rules to improve the models.

Module 8 assigns invalid traffic scores to traffic using both customer specific models managed by web risk system 21 and cross-customer models managed by module 4. Similarly, module 7 assigns malicious cyber traffic scores to traffic using both customer specific models managed by cyber risk system 11 and cross-customer models managed by module 3. These models may either use embedded signatures from their respective domain (e.g., cyber 18, web 20) or cross domain embedded signatures (e.g., 56 for CIVT, and 58 for IVT), depending upon the embodiment. The cyber models 63, cross-domain cyber models 69, web models 65, cross-domain web models 61, cross-customer models in module 3, and cross-customer models in module 4 are all managed by the model repository 44.

Figure 7:
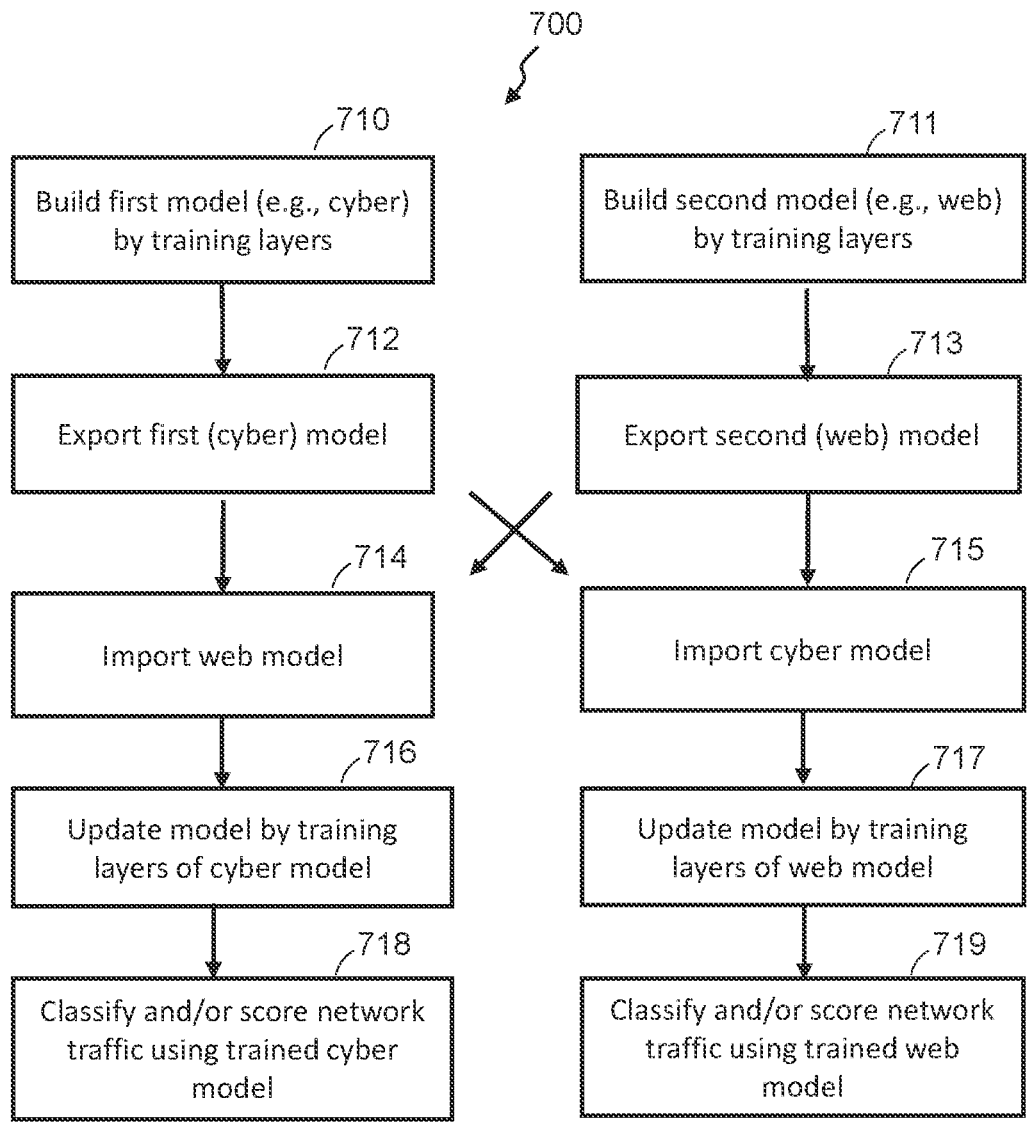
FIG. 7 is a flow chart of a method of classifying/scoring network traffic, according to some embodiments.

FIG. 7 is a flow chart of a method 700 of scoring network traffic, according to some embodiments. The method 700 includes step 710 of building a first model (e.g., cyber model) in a first domain (e.g., cyber) by training deep learning layers. Step 711 includes building a second model (e.g., web model) in a second domain (e.g., web) by training deep learning layers. In step 712, the cyber model is exported, and in step 713 a web model is exported. As previously described, one or more layers may be exported from one system and imported into another system, by using known model exchange formats (e.g., Open Neural Network Exchange (ONNX) Format, Portable Format for Analytics (PFA), Predictive Model Markup Language (PMML), etc.). In step 714, the web model is imported, and in step 715, the cyber model is imported. In step 716, the cyber model is updated by training layers of the cyber model using data from the web model, and similarly in step 717, the web model is updated by training deep learning layers of the web model using data from the cyber model. In steps 718 and 719 respectively, network traffic from the cyber domain and the web domain are classified and/or scored using the trained and updated cyber and web models. Using the scores, the network traffic may be flagged, blocked or otherwise limited.

Figure 8:
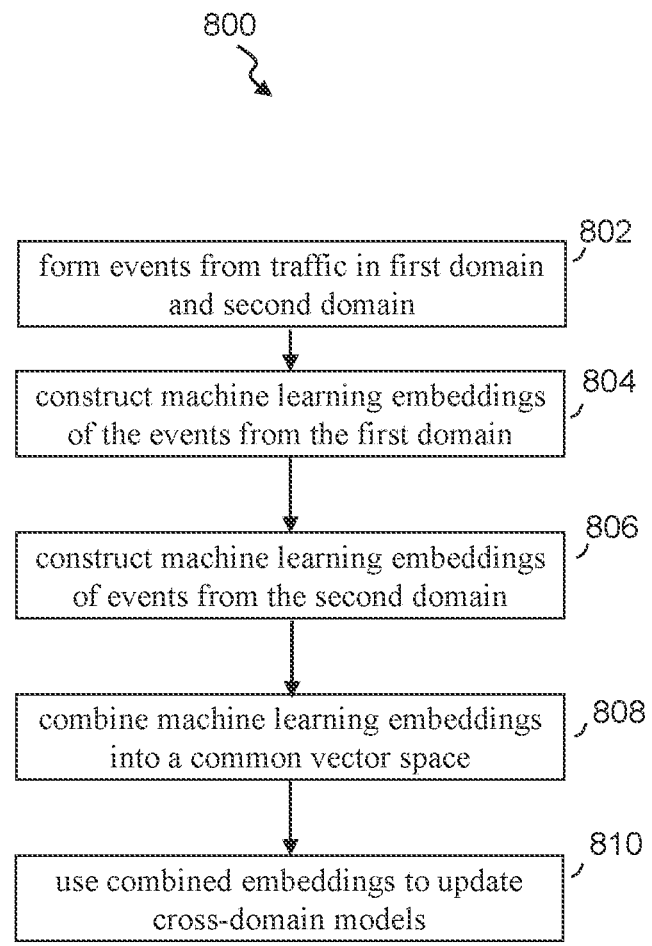
FIG. 8 is a flow chart of updating cross-domain models, according to some embodiments.

FIG. 8 is a flow chart of a method 800 of updating cross-domain models, according to some embodiments. The method 800 includes the step of forming 802 events from traffic in first domain and second domain. The method 800 further includes the step of constructing 804 machine learning embeddings of the events from the first domain. The method 800 further includes the step of constructing 806 machine learning embeddings of events from the second domain. The method 800 further includes the step of combining 808 machine learning embeddings into a common vector space. The step 800 further includes the step of using 810 the combined embeddings to update cross-domain models.

Figure 9:
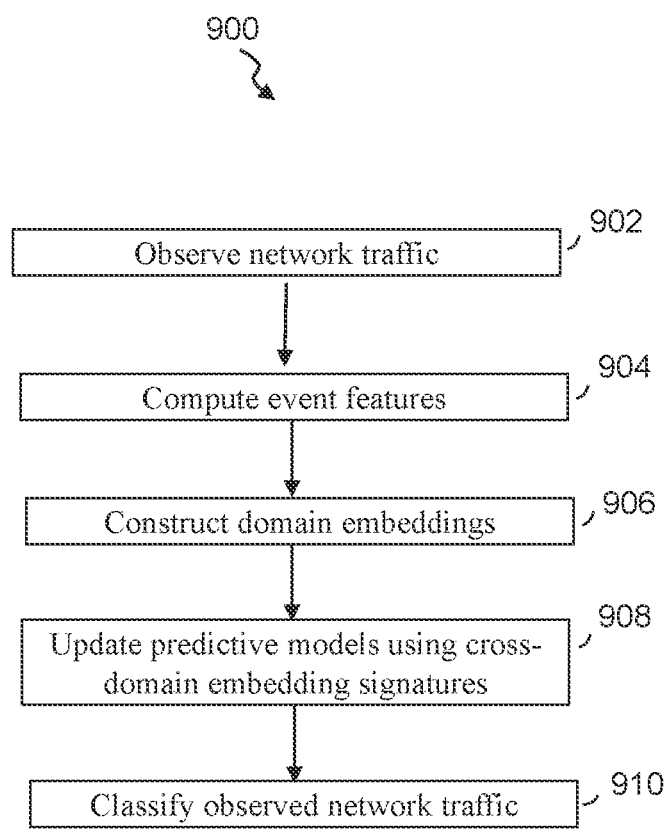
FIG. 9 is a flow chart of another method of classifying/scoring network traffic, according to some embodiments.

FIG. 9 is a flow chart of a method 900 of classifying network traffic from multiple domains in a network according to some embodiments. The method 900 includes the step of observing 902 network traffic observing network traffic over time. The method 900 further includes computing 904 event features in a plurality of domains from the observed network traffic. The method 900 further includes constructing 906 embeddings based on the event features computed for each of the plurality of domains to obtain embedding signatures for each of the plurality of domains, respectively. The method 900 further includes updating 908 an existing predictive model within each of the plurality of domains by transferring the embedding signature from one domain to a different domain, within the plurality of domains, to obtain an updated predictive model for each of the plurality of domains. The method 900 further includes classifying 910 the observed network traffic by applying the updated predictive model.

In an embodiment, the embedding signature transferred does not include restricted data. In an embodiment, the plurality of domains includes at least one of: cybersecurity data, video data, web interface interactions, web interface transactions, web advertising, mobile site advertising, advertising in streaming, and advertising in over-the-top services. In an embodiment, the embedding signature includes one of a temporal signature, a structural signature, and a domain signature. In an embodiment, the updating comprises: constructing a first plurality of deep machine learning embeddings of events of the traffic from the first domain in a vector space $V_1$; constructing a second plurality of deep machine learning embeddings of events of the traffic from the second domain in a vector space $V_2$; and combining the first and second plurality of deep machine learning embeddings in a common vector space V being created therefrom.

In an embodiment, the combining includes performing a stochastic gradient descent computation to estimate a matrix from $V_1$ to $V_2$, the common vector space V being created therefrom. In an embodiment, the method further comprises creating a score of the observed network traffic indicating a likelihood of being malicious or invalid. In an embodiment, the method further comprises creating an alert based on a value of the score being above a threshold. In an embodiment, the method further comprises blocking traffic within the network based on a value of the score.

In an embodiment, a computer-based system for identifying malicious or invalid network traffic in a multi-domain network, the system comprising: a computing module having a processor; a plurality of embedding modules adapted and configured to process traffic from a first domain and second domain within a network; and a multi-domain embedding module, coupled to the plurality of embedding modules, for storing embeddings from the first and second domain, the first and second domains being different from each other. The processor of the computing module is configured to cause the computing module to: observe traffic in the network; compute traffic embeddings from the first and second domain using the plurality of embedding modules; compute multi-domain embeddings from the first and second domain; train a deep learning model using the multi-domain embeddings; and compute a score of the traffic using the trained deep learning model; wherein the score indicates a likelihood of identifying the traffic as being malicious or invalid.

In an embodiment, a computer-based system for identifying malicious or invalid network traffic in a multi-domain network, the system comprising: a computing module having a processor and a memory for storing instructions; a machine learning module for building a plurality of deep learning models; and a cross-domain training module communicatively coupled to the machine learning module. The instructions, when executed by the processor, cause the computing module to: observe traffic in a network from at least a first and a second domain, the first and second domain being different from each other; build a first and a second deep learning model from the first and second domains, respectively; cause the cross-domain training module to update at least the first deep learning model using data imported from the second deep learning model, thereby creating a cross-domain trained model; and compute a score for the traffic using the at least one cross-domain trained model. The score indicates a likelihood of identifying the traffic as being malicious or invalid.

The embodiments contemplate a computer program being readable by a computer for executing one or more systems or methods of the embodiments. The embodiments further contemplate a machine-readable memory tangibly embodying a program of instructions executable by the machine for executing one or more methods of the invention. It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

What is claimed is:

1. A method of classifying network traffic from multiple domains in a network, the method comprising the steps of:
   observing network traffic over time;
   computing event features in a plurality of domains for network traffic events of the observed network traffic;
   for each of the plurality of domains, constructing embeddings based on the event features computed for each network traffic event in that domain;
   updating an existing predictive model within each of the plurality of domains by transferring an embedding signature from one domain to a different domain, within the plurality of domains, to obtain an updated predictive model for each of the plurality of domains, wherein the updating comprises:
   constructing a first plurality of deep machine learning embeddings of events of the traffic from the first domain in a vector space V1;
   constructing a second plurality of deep machine learning embeddings of events of the traffic from the second domain in a vector space V2; and
   combining the first and second plurality of deep machine learning embeddings in a common vector space V being created therefrom; and
   classifying the observed network traffic by applying the updated predictive model.

2. The method of claim 1, wherein the embedding signature transferred does not include restricted data.

3. The method of claim 1, wherein the plurality of domains includes at least one of:
   cybersecurity data, video data, web interface interactions, web interface transactions, web advertising, mobile site advertising, advertising in streaming, and advertising in over-the-top services.

4. The method of claim 1, wherein the embedding signature includes one of a temporal signature, a structural signature, and a domain signature.

5. The method of claim 1, wherein the combining includes performing a stochastic gradient descent computation to estimate a matrix from V1 to V2, the common vector space V being created therefrom.

6. The method of claim 1, further comprising: creating a score of the observed network traffic indicating a likelihood of being malicious or invalid.

7. The method of claim 6, further comprising: creating an alert based on a value of the score being above a threshold.

8. The method of claim 6, further comprising: blocking traffic within the network based on a value of the score.

9. A computer-based system for identifying malicious or invalid network traffic in a multi-domain network, the system comprising:
   a computing module having a processor and a memory for storing instructions;

a machine learning module for building a plurality of deep learning models; and a cross-domain training module communicatively coupled to the machine learning module;

wherein the instructions, when executed by the processor, cause the computing module to:

observe traffic in a network from at least a first and a second domain, the first and second domain being different from each other;

build a first and a second deep learning model from the first and second domains, respectively, wherein the building the first and the second deep learning model comprises:

constructing a first plurality of deep machine learning embeddings of events of the traffic from the first domain in a vector space V1;

constructing a second plurality of deep machine learning embeddings of events of the traffic from the second domain in a vector space V2;

combining the first and second plurality of deep machine learning embeddings in a common vector space V being created therefrom; and using the combination of first and second plurality of deep machine learning embeddings in the common vector space V to train each of the first and the second deep machine learning models;

cause the cross-domain training module to update at least the first deep learning model using data imported from the second deep learning model, thereby creating a cross-domain trained model; and compute a score for the traffic using the at least one cross-domain trained model, wherein the score indicates a likelihood of identifying the traffic as being malicious or invalid.

10. The computer-based system of claim 9, further comprising a model repository for storing the plurality of deep learning models, wherein the cross-domain training module is in communication with the model repository.

11. The computer-based system of claim 9, wherein the computing module trains respective deep learning layers of the first and second deep learning models.

12. The computer-based system of claim 9, wherein each the first domain and the second domain are one of: cybersecurity data, video data, web interface interactions, web interface transactions, web advertising, mobile site advertising, advertising in streaming, and advertising in over-the-top services.

13. The computer-based system of claim 9, wherein the cross-domain trained model is continuously evaluated for performance and automatically updated.

14. The computer-based system of claim 9, wherein the computing module creates an alert based on a value of the score above a threshold.

15. The computer-based system of claim 9, wherein the computing module blocks traffic within the network based on the score.

16. A computer-based system for identifying malicious or invalid network traffic in a multi-domain network, the system comprising:

a computing module having a processor and a memory for storing instructions;

a plurality of embedding modules adapted and configured to process network traffic events from a first domain and second domain within a network; and a multi-domain embedding module, coupled to the plurality of embedding modules, for storing embeddings from the first and second domain, the first and second domains being different from each other;

wherein the processor of the computing module is configured to cause the computing module to:

observe traffic in the network;

compute traffic embeddings from the first and second domain using the plurality of embedding modules;

compute multi-domain embeddings from the first and second domain;

train a deep learning model using the multi-domain embeddings, wherein the computing the multi-domain embeddings from the first and second domain comprises:

constructing a first plurality of deep machine learning embeddings of events of the traffic from the first domain in a vector space $V_1$;

constructing a second plurality of deep machine learning embeddings of events of the traffic from the second domain in a vector space $V_2$;

combining the first and second plurality of deep machine learning embeddings in a common vector space V being created therefrom; and compute a score of the traffic using the trained deep learning model;

wherein the score indicates a likelihood of identifying the traffic as being malicious or invalid.

17. The computer-based system of claim 16, wherein the first and second domains are one of: cybersecurity data, video data, web interface interactions, web interface transactions, web advertising, mobile site advertising, advertising in streaming, and advertising in over-the-top services.

18. The computer-based system of claim 16, wherein the trained deep learning model is continuously evaluated for performance and automatically updated.

19. The computer-based system of claim 16, wherein the computing module creates an alert based on a value of the score above a threshold, and blocks traffic within the network based on the value of the score.

* * * * *